United States Patent [19]

Grace et al.

[11] Patent Number: 4,741,795
[45] Date of Patent: May 3, 1988

[54] METHOD OF AND APPARATUS FOR LINING PIPES

[75] Inventors: John C. Grace, Prestbury; James C. Grace, Hale, both of United Kingdom

[73] Assignee: Tate Pipe Lining Processes Limited, United Kingdom

[21] Appl. No.: 49,294

[22] PCT Filed: Aug. 14, 1986

[86] PCT No.: PCT/GB86/00486

§ 371 Date: Apr. 14, 1987

§ 102(e) Date: Apr. 14, 1987

[87] PCT Pub. No.: WO87/01173

PCT Pub. Date: Feb. 26, 1987

[30] Foreign Application Priority Data

Aug. 15, 1985 [GB] United Kingdom ............... 8520525
Dec. 13, 1985 [GB] United Kingdom ............... 8520725

[51] Int. Cl.⁴ .................................... B29C 63/34
[52] U.S. Cl. .................................... 156/247;
  118/306; 118/DIG. 10; 156/259; 156/294;
  156/330; 156/331.7; 156/344; 156/391;
  156/423; 156/575; 156/577; 156/578; 222/103;
  222/107; 264/309; 264/311; 264/312; 264/316;
  425/262; 425/460
[58] Field of Search .............. 156/247, 294, 423, 347,
  156/330, 391, 575, 578, 577, 331.7, 259;
  118/105, 306, 408, DIG. 10; 425/262, 460, 469;
  264/309, 311, 312, 316; 222/95, 103, 107

[56] References Cited

U.S. PATENT DOCUMENTS 2,204,785  6/1940  Bennett ........................ 264/312
2,851,061  9/1958  Bernard et al. ................ 118/105
3,004,278  10/1961  Stanley ...................... 118/DIG. 10
3,333,311  8/1967  Matheny et al. ................ 118/306
3,908,799  9/1975  Valeriano .................... 118/DIG. 10
3,960,644  6/1976  McFadden .................... 156/423
4,325,772  4/1982  Suetoshi et al. .............. 156/294
4,401,696  8/1983  Wood ......................... 427/236
4,427,480  1/1984  Kamuro et al. ................ 156/294
4,602,974  7/1986  Wood et al. ................. 118/DIG. 10

FOREIGN PATENT DOCUMENTS 1512035  5/1978  United Kingdom .
2082285  3/1982  United Kingdom .
1352829  5/1984  United Kingdom .

Primary Examiner—Jerome Massie
Attorney, Agent, or Firm—Nixon & Vanderhye

[57] ABSTRACT

A method of lining pipes comprises the steps of laying along the pipe (56) hoses (63) filled with constituent components of a settable resinous lining composition, axially slitting the hoses, conveying the constituent components to a mixing chamber (65), and centrifugally impelling the mixed lining composition against the wall of the pipe (56). A lining apparatus (50) for carrying out the method is advanced along the pipe (56) and comprises delivery tubes (62) with slitting blades (70) at their leading ends which are pushed through the holes (63) and which communicate with a mixing chamber (65) which, in turn, is open to a centrifugal impeller (57) of a lining machine. The slit and emptied hoses (63) may be left in situ in the pipe (56) or removed therefrom in advance of the lining apparatus (50). A trowelling arrangement using a thin-walled, flexible tube (112) of, for example, a cellulose polymer and a conical trowel (112) is employed to smooth the pipe lining.

44 Claims, 11 Drawing Sheets

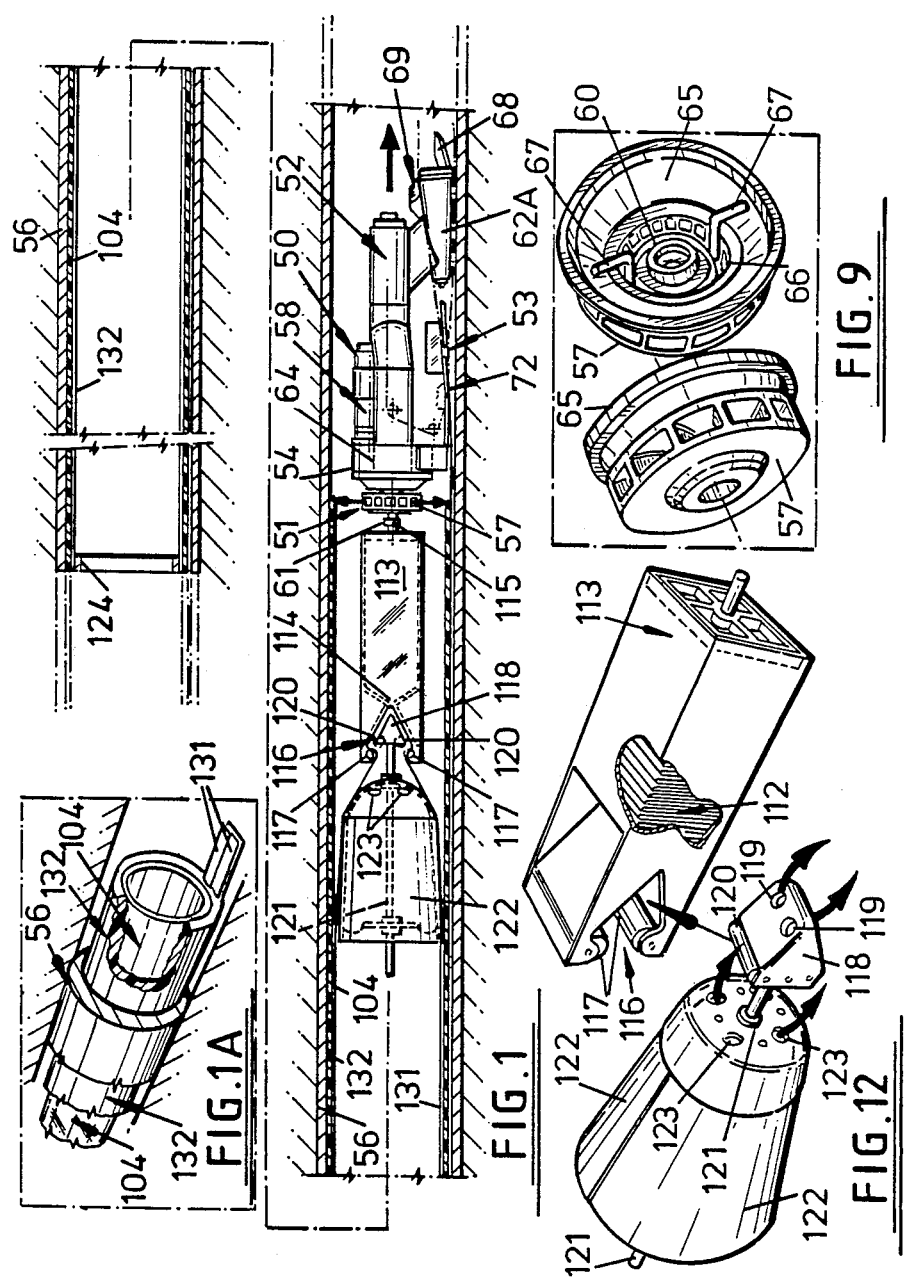

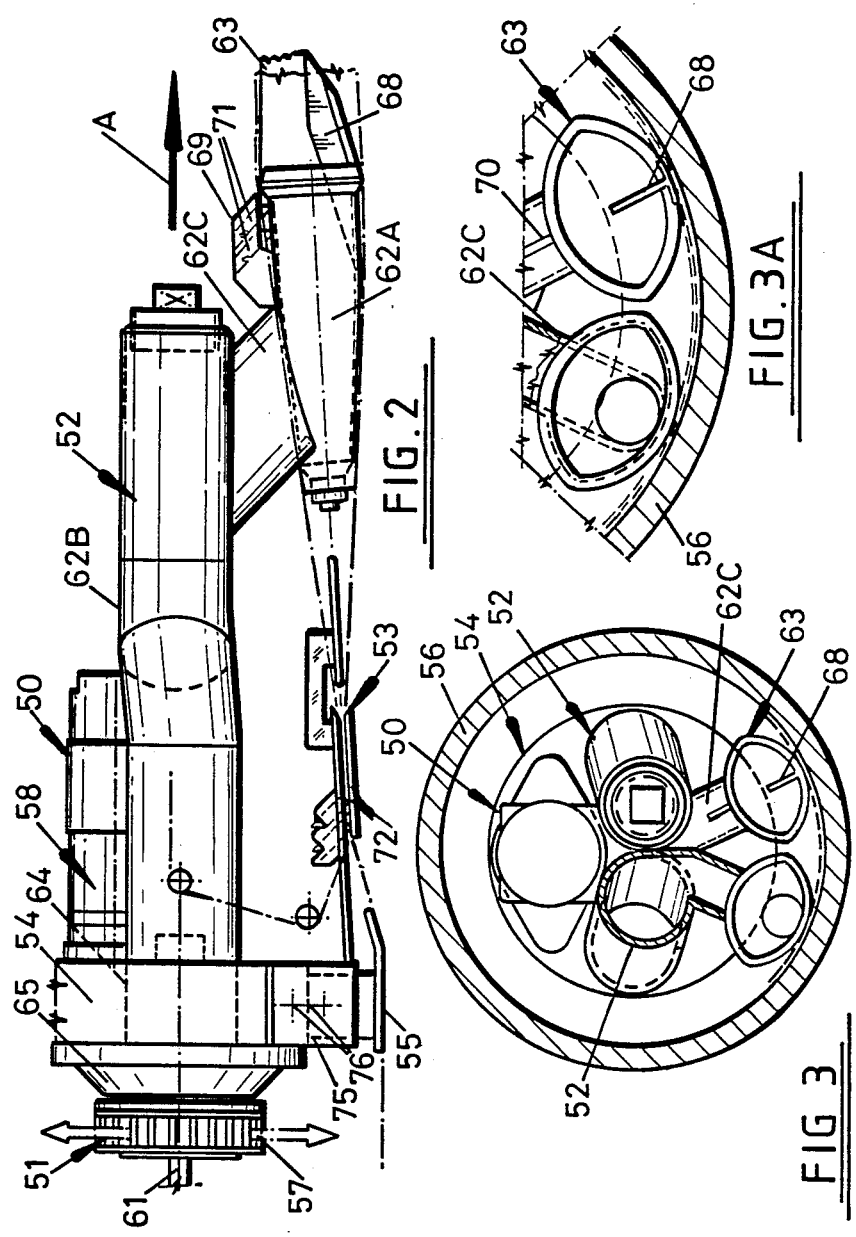

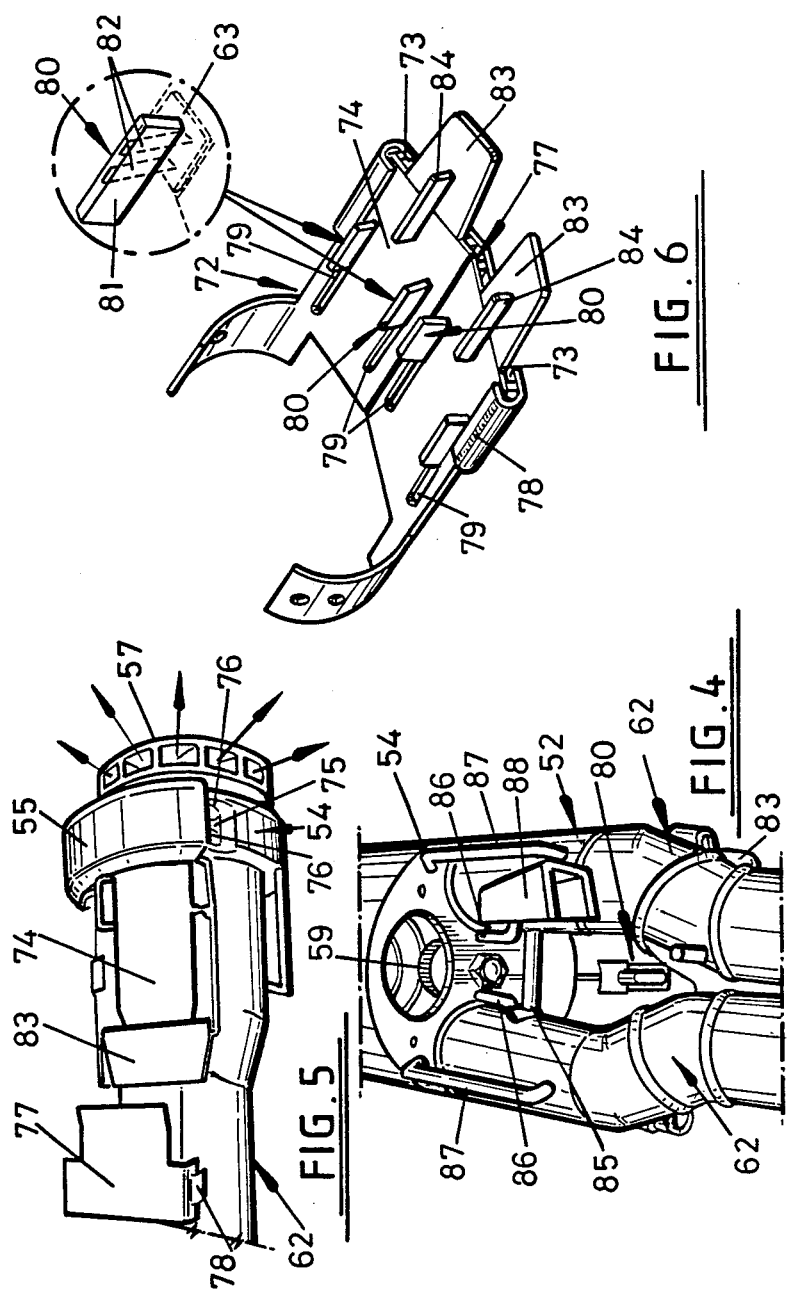

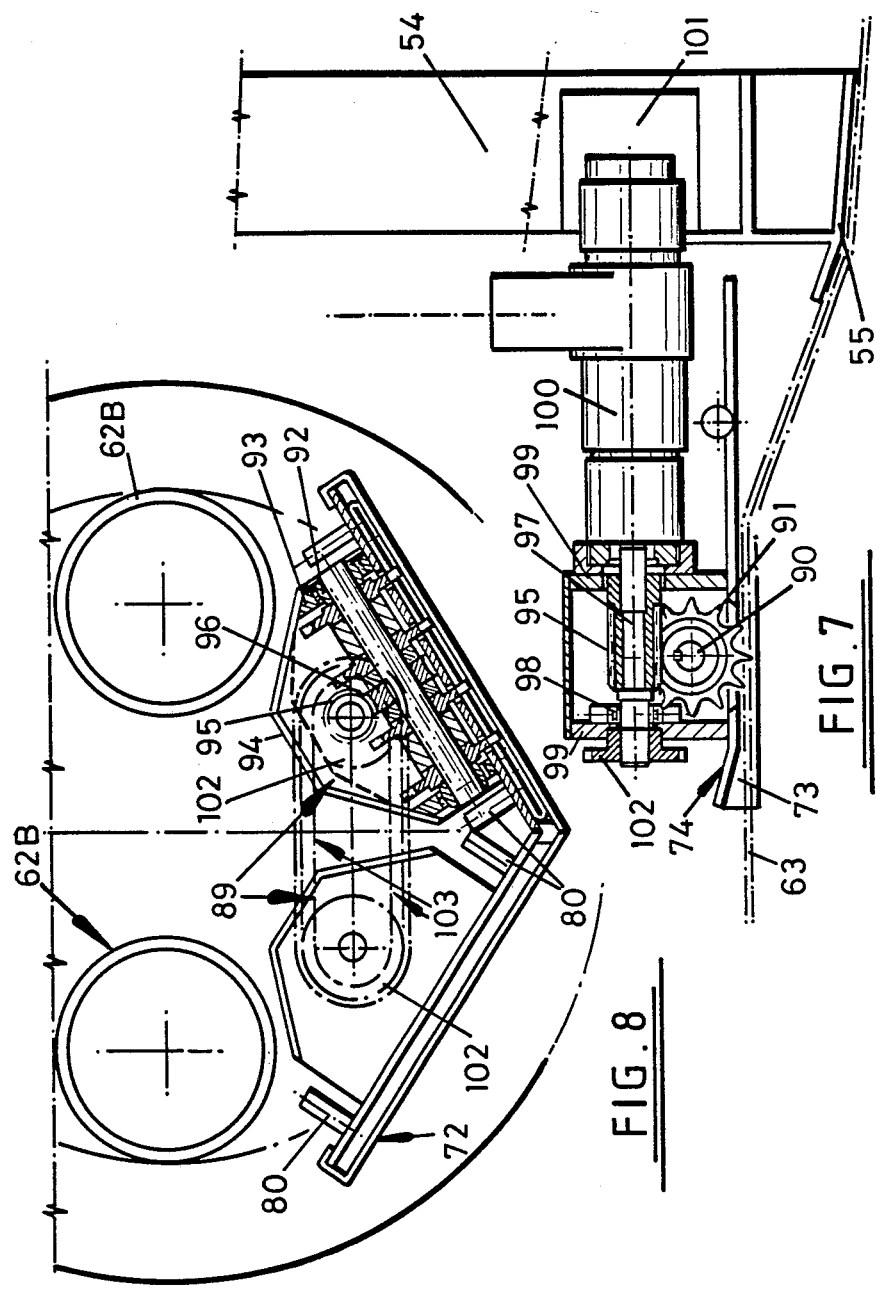

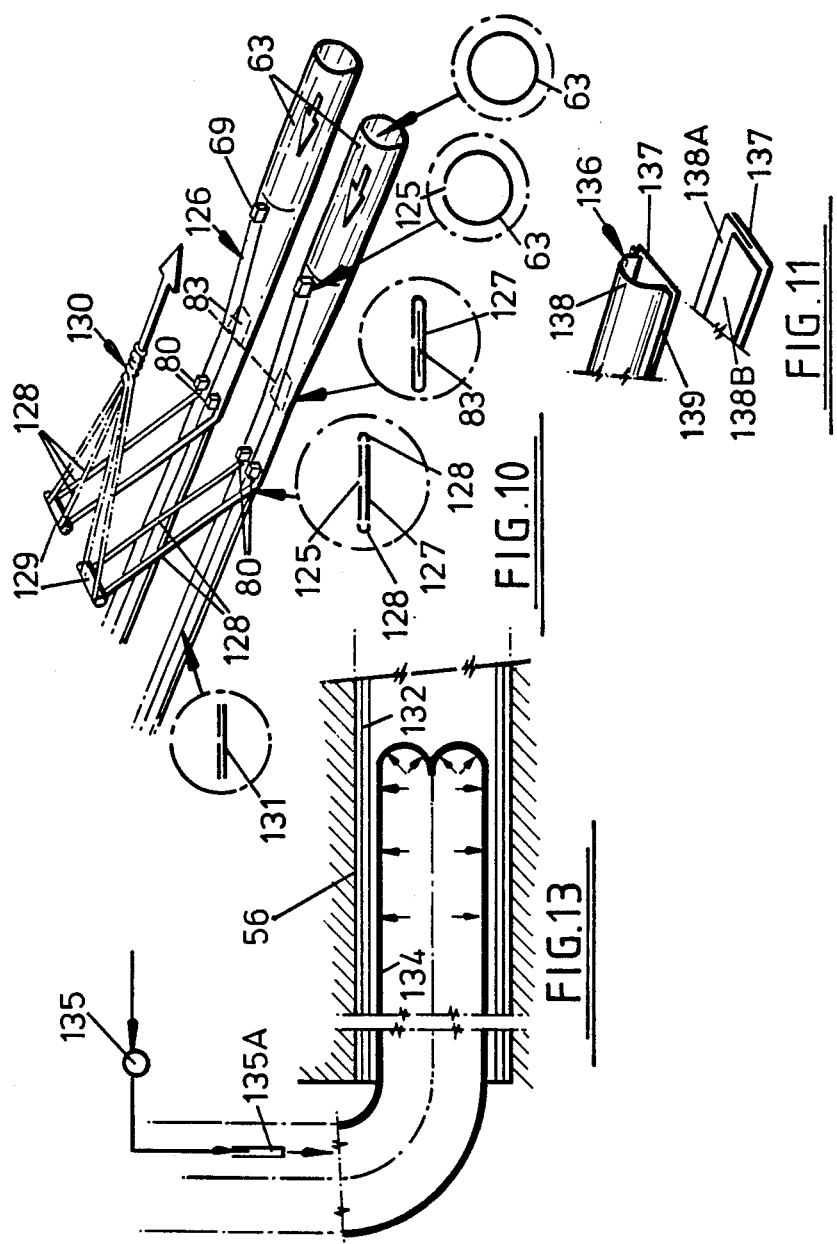

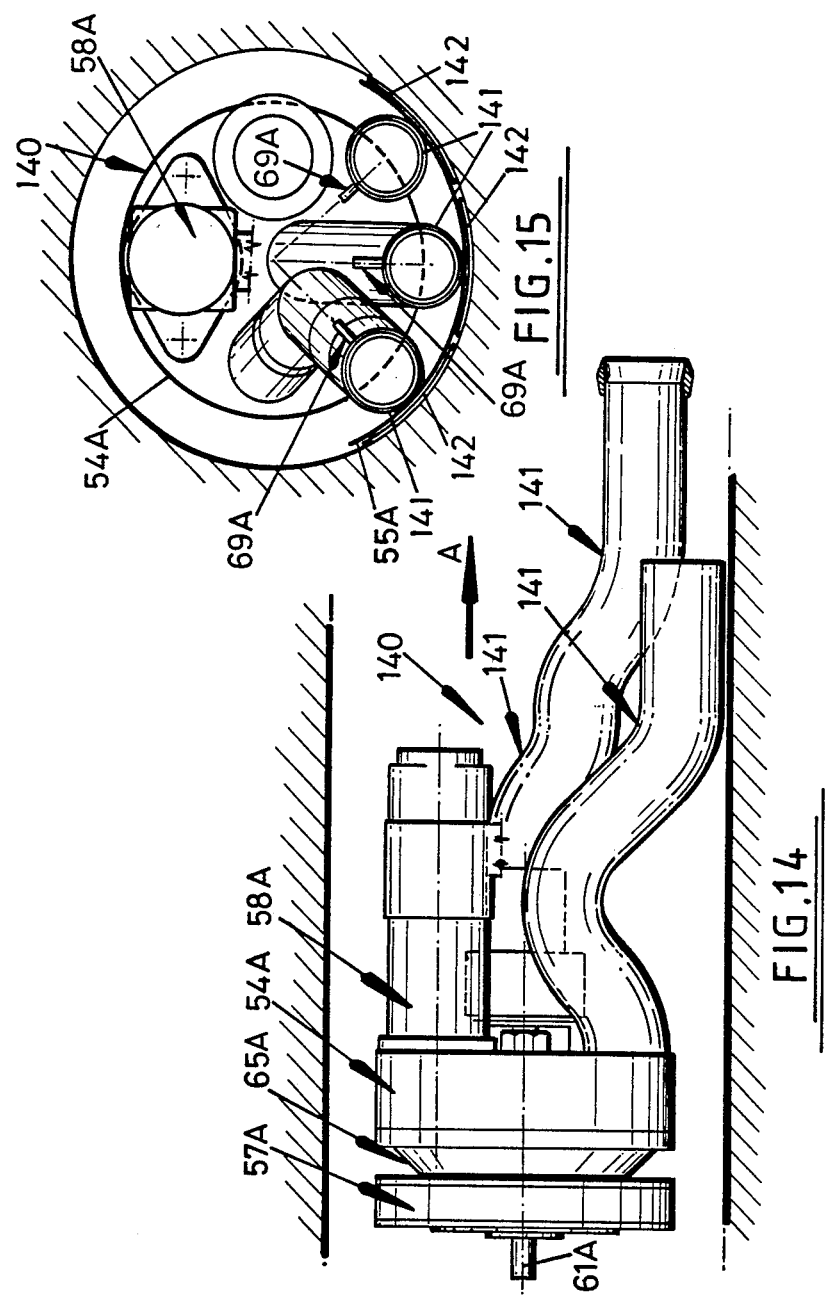

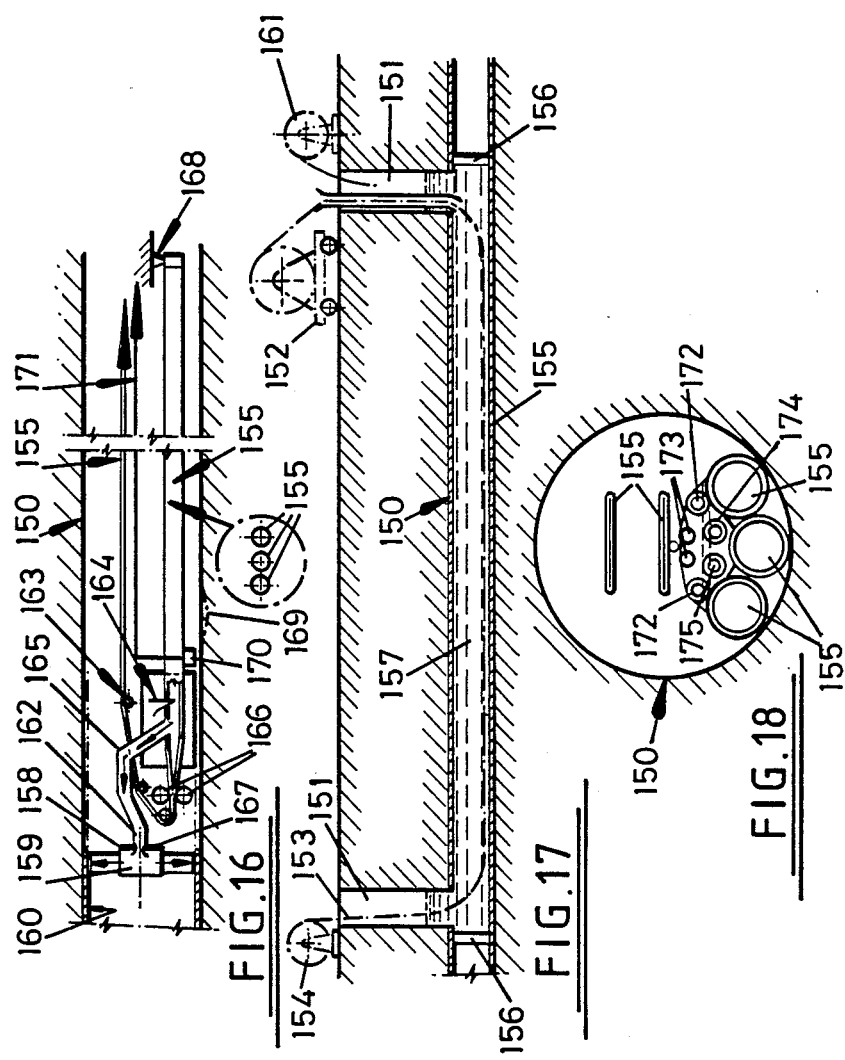

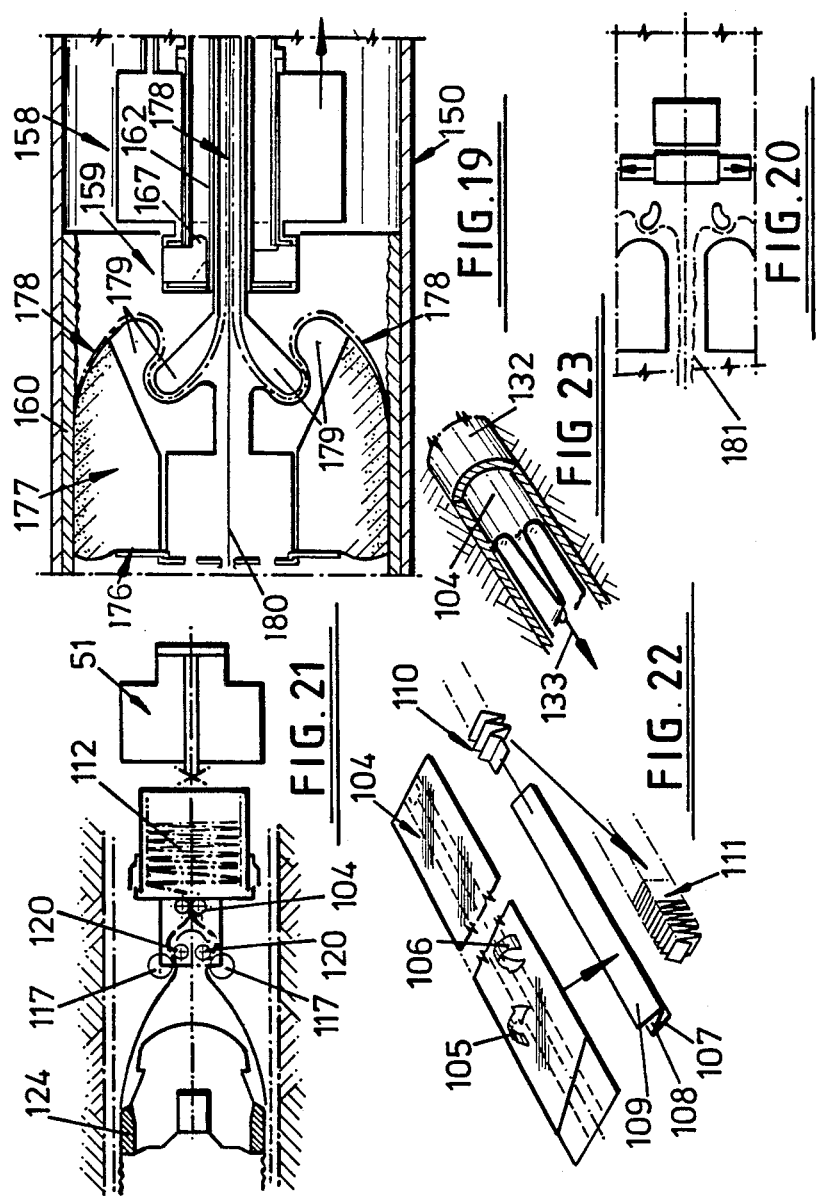

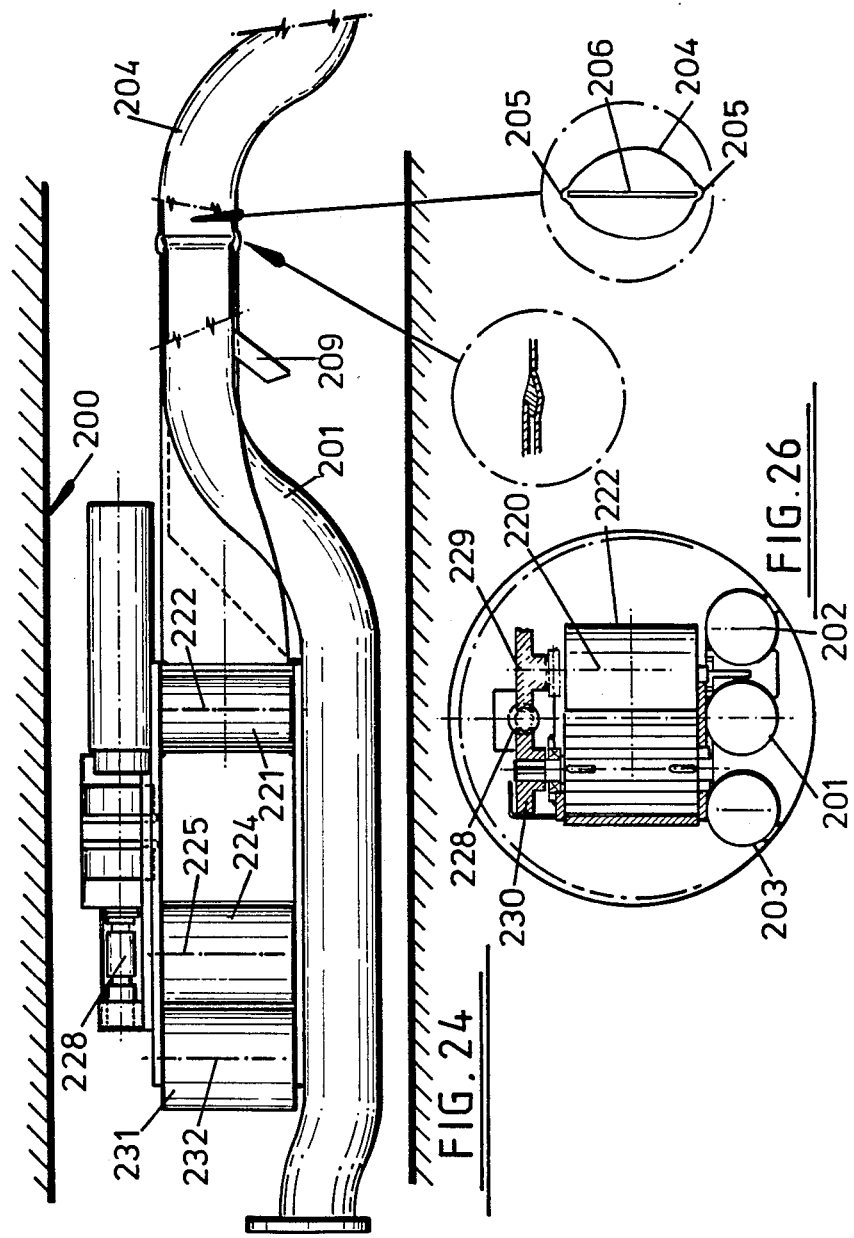

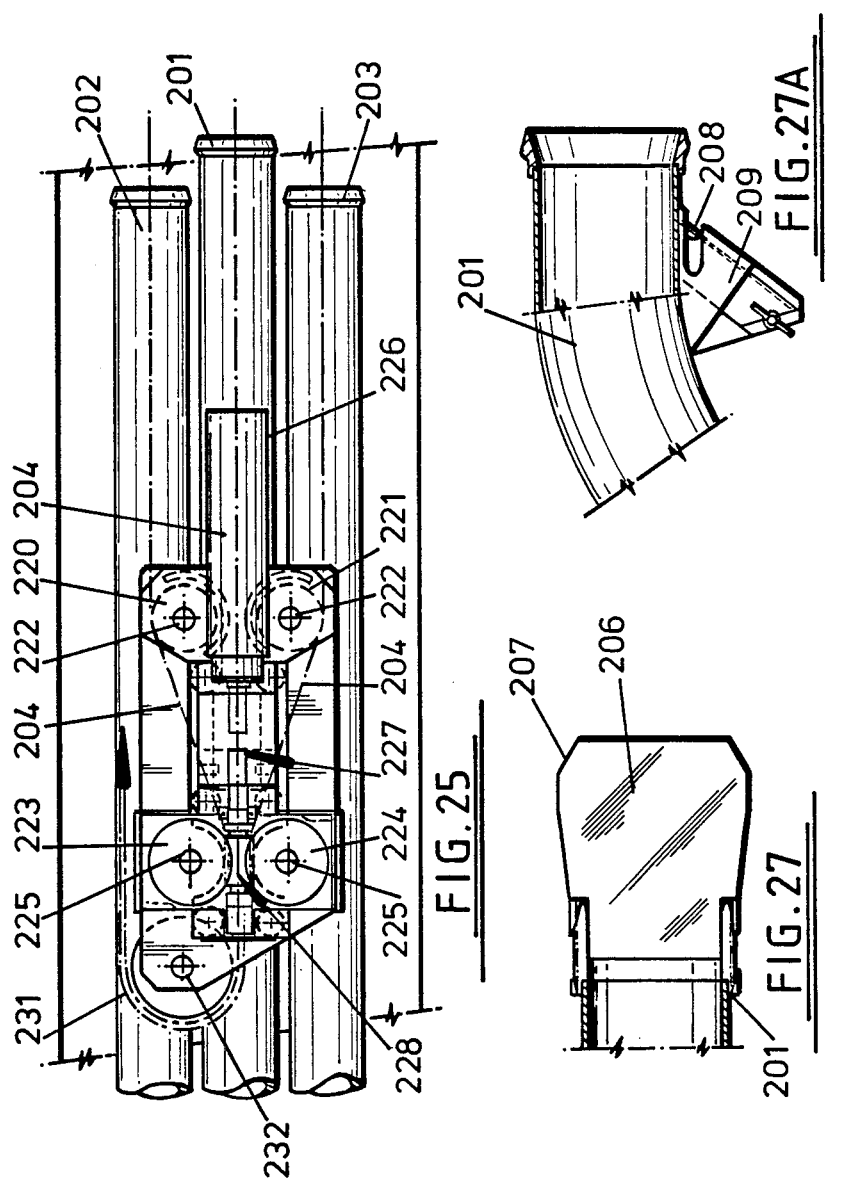

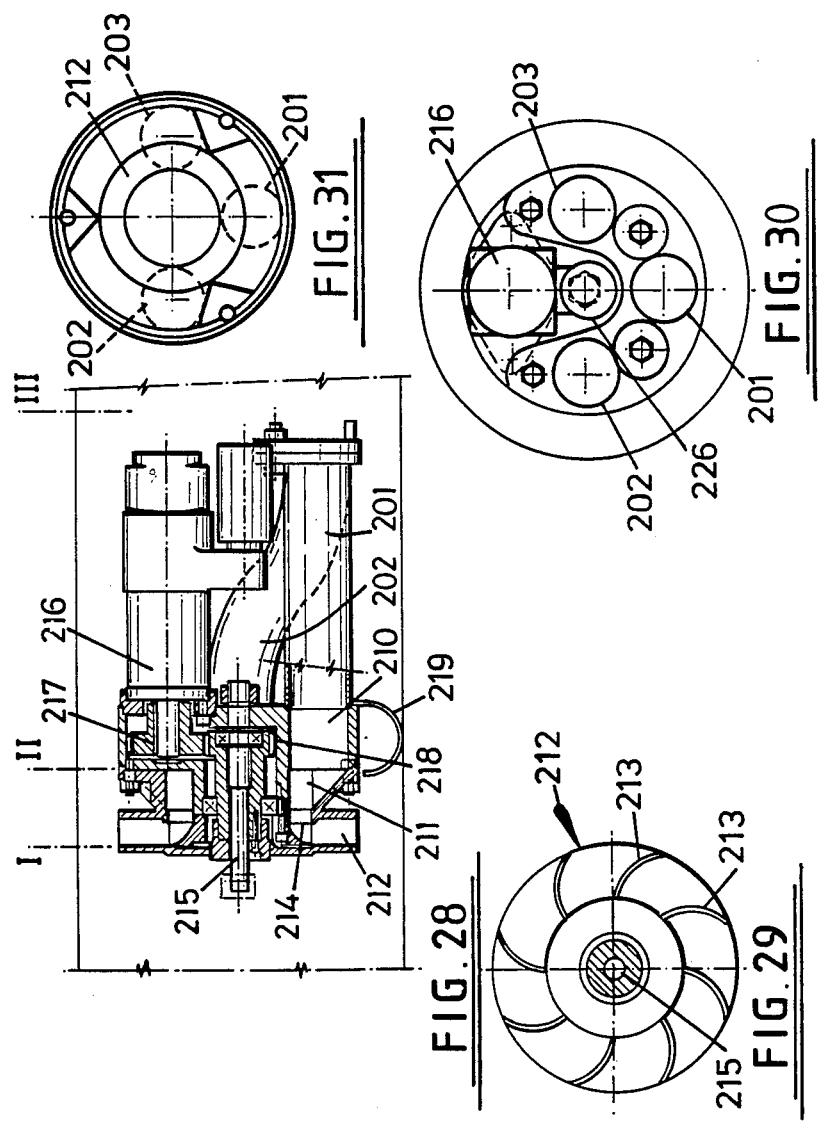

METHOD OF AND APPARATUS FOR LINING PIPES

This invention relates to a method of and apparatus for lining pipes, especially but not exclusively underground sewers or other tunnel-like excavations. The present invention is particularly concerned with the relining of existing sewers, expecially but not exclusively such sewers having a diameter within the range of 9 inches to 24 inches (23 cms. to 61 cms.).

The lining composition used with the present invention is preferably a settable, two-shot resin based structural lining material consisting of a resin and a curing or hardening agent.

The resin is preferably an epoxy resin but may alternatively be a polyurethane.

The curing or hardening agent preferably contains inorganic fillers.

The preferred lining composition is a settable two-shot epoxy resin-based one containing inorganic fillers.

It is to be noted however that the resin and the curing or hardening agent may be provided in the ratio of two to one.

For convenience the term "pipe" is used herein and in the claims, save for the descriptions with reference to the drawings which are concerned particularly with lining sewers, but it is clearly to be understood that the term "pipe" includes within its scope sewers, other underground excavations and, in general, any linear hole or passage capable of being lined by the method and apparatus of the present invention.

According to the present invention there is provided a method of lining a pipe comprising the steps of laying along the pipe hose means filled with a predetermined quantity of settable lining composition to be applied against the pipe wall; advancing a centrifugal lining machine along the length of the hose means; axially slitting the hose means in front of the advancing centrifugal lining machine to permit egress of the lining composition from the hose means; and guiding the egressing lining composition into the centrifugal lining machine for application to the pipe wall as it advances along the hose means.

Also according to the present invention there is provided apparatus for lining a pipe with a settable lining composition contained in hose means laid along the pipe, the apparatus being adapted to be advanced through the pipe and comprising a centrifugal lining machine having inlet means for the settable lining composition, delivery tube means connected, at one end, to the inlet means and adapted, at the other end, for insertion into the hose means filled with the settable lining composition, and hose-slitting means at or adjacent the other end of the delivery tube means for axially slitting the hose means as the delivery tube means is urged into the hose means, whereby the settable lining composition can flow from the hose means into the delivery tube means and thence to the centrifugal lining machine.

As essential feature of the present invention is therefore to lay hose means filled with settable lining composition along the bottom of a pipe to be lined and advance a lining apparatus along the hose means which apparatus axially slits the hose means, collects the settable lining composition from the hose means and feeds it to a centrifugal lining machine, which is a part of the apparatus, which centrifugally sprays or throws the settable lining composition onto the pipe wall to line same.

It is preferred to emply to hoses laid in parallel side-by-side relationship, one containing a resin and the other containing a curing or hardening agent (with or without inorganic fillers), and the hoses equalling in length, or substantially so, the length of pipe to be lined.

In this latter preferred embodiment, the axially-slit and emptied hoses remain in situ in the pipe in a flattened condition covered by the lining composition. This is not considered detrimental to the applied structural lining.

In this preferred embodiment, the closed lateral edges of the flattened hoses may be severed and guided away from the hoses and eventually out of the pipe prior to the flattened hoses being covered by the settable lining composition.

The volumetric capacity of each hose is preferably such as to provide the quantity of resin and hardener sufficient to give a predetermined thickness of structural lining on the pipe wall. Such a thickness may, for example, be within the range of 1% to 5% of the pipe diameter.

A trowelling or smoothing method is preferably provided which employs as a trowelling medium a flexible thin-walled tube applied under pressure against the structurally-lined pipe wall, prior to setting or curing of settable lining composition, to remove any orange peel effect from the structural lining. This trowelling tube, which may be a cellulose polymer such as CELLOPHANE (Trade Mark), may be removed or simply left in situ.

A preferred arrangement for effecting this trowelling comprises a magazine containing a concerntina-like supply of folded flattened flexible thin-walled tube, the magazine having a slot exit for the flattened tube, means for initiating opening of the latter from its folded flattened condition into open tube configuration as it exits from the slot, and means for applying the fully-opened tube, under pressure, against the lined pipe wall.

While the preferred embodiment of the present invention employs two hoses to provide the constituent components of the settable lining composition, the scope of the present invention envisages the use of a single hose divided internally, for example concentric hose elements, or the use of more than two hoses, for example three (two containing resin, one hardener).

Also the present invention takes within its scope the complete removal of the axially-slit hose or hoses after it or they has or have been emptied of the respective constituent lining composition component.

Embodiments of the present invention will now be described, by way of example with reference to the accompanying drawings, in which:

FIG. 1 is an axial sectional view through a sewer pipe showing the apparatus for and method of lining the sewer pipe according to the present invention;

FIG. 1A is a detail perspective scrap view showing the individual layers of a sewer pipe lined according to the present invention;

FIG. 2 is a side elevation of a preferred lining apparatus according to the present invention;

FIG. 3 is an end view of the lining apparatus of FIG. 2 within a sewer pipe looking from the end of the pipe to which the lining apparatus is advancing;

FIG. 3A is a fragmentary detail view to an enlarged scale;

FIGS. 4 and 5 are respectively fragmentary perspective views of the lining apparatus of FIG. 2 from above and from below;

FIG. 6 is a perspective view of a sub-assembly of a hose-flattening and hose-edge trimming arrangement;

FIGS. 7 and 8 are respectively a side view and an end view of a toothed tractor arrangement which cooperates with the hoses to assist advancement of the lining apparatus along the sewer pipe;

FIG. 9 shows perspective views of a centrifugal impellor of the centrifugal lining machine used in the lining appartatus of FIG. 2;

FIG. 10 is a perspective flow diagram showing the method of handling the hose according to the preferred embodiment of the present invention.

FIG. 11 is a diagrammatic view of an alternative hose construction;

FIG. 12 is a perspective view of a trowelling arrangement according to the present invention;

FIG. 13 is a diagrammatic view of a temporary support to resist ground water destruction of, or damage to, the applied structural lining;

FIGS. 14 and 15 are respectively side and end elevations corresponding to FIGS. 2 to 3 of a three hose lining apparatus;

FIG. 16 is a diagrammatic view of another embodiment of apparatus for lining sewer pipe walls in accordance with the present invention;

FIG. 17 is a diagrammatic view illustrating a method of laying the constituent component hoses along the length of the sewer pipe to be lined;

FIG. 18 is a diagrammatic transverse cross section through a sewer pipe showing a possible layout of the services and of the hoses filled and empty of the lining apparatus of FIG. 16;

FIG. 19 is a diagrammatic view corresponding to FIG. 12 of a modified trowelling arrangement;

FIG. 20 is a diagrammatic view of a modification of FIG. 19;

FIG. 21 is a diagrammatic elevation of the preferred trowelling or smoothing arrangement of FIG. 12;

FIG. 22 shows the flexible thin-walled tube used as the trowelling or smoothing medium;

FIG. 23 illustrates diagrammatically removal of the trowelling tube from the lines sewer wall;

FIG. 24 is a side elevation of an alternative delivery tube/hose slitting and return arrangement;

FIG. 25 is a plan view corresponding to FIG. 24;

FIG. 26 is a parti-sectional end view corresponding to FIG. 24;

FIGS. 27 and 27A are detail views of another configuration of delivery tube/hose entry end;

FIG. 28 is a parti-sectional view of one form of centrifugal lining apparatus;

FIG. 29 is a sectional view on the line I—I of FIG. 28;

FIG. 30 is a sectional view on the line III—III of FIG. 28; and

FIG. 31 is a sectional view on the line II—II of FIG. 28.

Reference is made first to the preferred embodiment of the present invention as illustrated in FIGS. 1 to 12 and FIGS. 21 and 22 of the present invention.

The lining apparatus 50 comprises a centrifugal lining machine 51, a settable lining delivery system generally indicated at 52, and a hose-handling system generally indicated at 53.

The lining apparatus comprises a main housing 54 mounted on a skid structure 55 and, in use, the lining apparatus 50 is advanced through a sewer pipe 56 in the direction indicated by the arrow A (FIG. 2).

The centrifugal lining machine 51 comprises a bladed centrifugal impellor 57 which is rotated by an air vane motor 58 mounted on the housing 54 via reduction gearing 59 within the latter and drivingly coupled with a tubular shaft 60 of the centrifugal impellor 57. A static shaft 61 extends axially outwards of the centrifugal lining machine 51 (see FIG. 2).

The settable lining composition delivery system 52 comprises a pair of identical delivery tubes 62, each comprising a lower tubular portion 62A which extends into a hose 63, an upper tubular portion 62B which communicates with a passage 64 in the housing 54, and an upwardly inclined tubular portion 62C connecting tubular portions 62A and 62B.

The two passages 64 in the housing 54 communicate with a static mixing chamber 65 secured to the housing 54 immediately adjacent the centrifugal impellor 57, which chamber 65 communicates as indicated at 66 (FIG. 9) with the centre of the centrifugal impellor 57. The latter mounts two diametrically opposed, angled stirring elements 67 which project into the mixing chamber 65 in order to thoroughly and intimately mix the hitherto-separate epoxy resin and hardener constituent components of the settable lining composition.

At the leading end of each delivery tube 62 there is a guide skid 68 of inverted T-shape extending forwardly and upwardly and which ploughs through the lining composition constituent component in the respective hose 63 assisting to maintain the lining apparatus to ride over steps created by pipe joints.

The inlet mouth of each delivery tube 62 may be of any convenient cross-sectional shape, for example, circular but a preferred shape is lenticular.

On top of each tube portion 62A is a hose-slitting structure 69 comprising a cutting blade holder 70 welded to tube portions 62A and a pair of axially-spaced cutting blades 71. The leading blade 71 performs the hose-slitting action and the rear blade 71 is a back-up blade in case the leading blade 71 breaks. These blades 71 are demountable from the holder 70 for replacement purposes. They are simply screw clamped in position.

Considering the lining apparatus 50 in terms of its direction of advancement, there is disposed rearwardly of tube portions 62A and under tube portions 62B the hose handling system 53.

This comprises guide channel 72 of shallow inverted V-form divided internally to provide two separate passages 73, one for each hose 63, the passages 73 being relatively narrow in height (see FIG. 6). The guide channel 72 comprises a top plate 74 having lateral wings 75 at its rear end whereby the guide channel 72 can be removably bolted as indicated at 76 to the periphery of the housing 54, and a bottom plate 77 which is slidably engaged on the top plate 74 by return-bend lateral wings 78.

The top plate 74 is slotted as indicated at 79 adjacent each edge of each passage 73 and at each slot is a hose-edge severing structure 80 comprising a blade holder 81 welded to the top of the top plate 74 and a pair of axially-spaced cutting blades 82 extending through a respective slot 79 into the respective passage 73. Like hose-slitting structure 69, the leading blade 82 is the working blade and the rear blade 82 a back-up blade. The blades 82 are demountable and replaceable.

Spaced forwardly of each passage 73 and aligned with same is an "anti-tracking" shoe 83 welded to a cantilever bar 84 welded to the top plate 74. These shoes 83 ensure an exact presentation of the axially-split, emptied hoses 63 into the passages 73 for accurate edge severance.

Guides 85 and 86 are provided for the severed hose edge which are pulled back from the lining apparatus 50 in a return bend path in the direction of advancement of the lining apparatus.

Handles 87 are provided on top of the lining apparatus 50 to facilitate handling same into and out of a sewer through down holes from ground level.

A diverter cowl 88 is provided on one of the delivery tube portions 62B adjacent the exhaust of air vane motor 58.

In use, as will be described in more detail later, the lining apparatus 50 is towed along the sewer pipe 56 between two down holes by a winch at ground level and a cable (not shown) fixed to the lining apparatus say by the guide bar 85.

It may be necessary or desirable to assist this towing action and for this purpose a pair of toothed tractor arrangements 89 are provided (see FIGS. 7 and 8).

These tractor arrangements 89 are identical and are mounted on the guide channel 74, one between each pair of hose-edge severing structures 80.

Each tractor arrangement 89 comprises a rotatable shaft 90 mounting a series of spaced toothed wheels 91 which extend into a respective hose-guide passage 73 where they "bite" into the flattened hose 63 and claw the lining apparatus 50 along the hose 63 in the direction of lining apparatus advancement.

The shaft 90 is mounted in bearings 92 in side walls 93 of a housing 94 fixed to the top plate 74 of the guide channel 72.

The shaft 90 is driven by a worm gear 95 meshing with a gearwheel 96 fast on the shaft 90. The worm gear 95 is carried by a shaft 97 normal to the shaft 90 and supported in bearings 98 in end walls 99 of the housing 94. The shaft 97 is driven by an air vane motor 100 which is accommodated at one end in a cut-out 101 of the housing 54.

The other end of each shaft 97 extends of the housing 94 and mounts a chain wheel 102, the two chain wheels 102 being coupled together by a chain 103 thereby ensuring synchronous rotation of the toothed wheels 91.

The air supply to the air van motor 58 is connected to air van motor 100 by a T-pipe connection (not shown).

Reference is now made to the trowelling arrangement and in this connection reference is made to FIGS. 1, 12, 21 and 22.

Firstly (see FIG. 2), the trowelling medium is a tube of flexible thin-walled material such as a cellulose polymer, say Cellophane (Trade Mark).

It is laid as a flat tube as indicated at 104 and it is folded transversely firstly as indicated at 105 and then 106 to form a flat tube comprising layers 107, 108, 109. It is then folded longitudinally as indicated at 110 into a concertina configuration as indicated at 111. The flattened, folded, concertinad tube package 112 is then inserted into a magazine box 113 having a slot exit 114. The magazine box 113 is detachably coupled or clamped as indicated at 115 to the static shaft 61 of the centrifugal lining machine 51.

The magazine box 113 at its trailing end has a rearwardly divergent mouth 116 open at the sides and with a roller 117 freely rotatably mounted at the top and bottom of the widest part of the mouth 116.

Resting within the mouth 116 is a divergent spreader guide 118 apertured as indicated at 119 at its smaller end and freely mounting at its wider end, top and bottom, a roller 120.

The rollers 117 and 120 define top and bottom nips (see FIGS. 1 and 24).

Lateral straps (not shown) may be provided across the cheeks of the mouth 116 to hold the spreader guide 118 in position but these are not considered essential.

The spreader guide 118 is movably connected by a shaft 121 to a spring-loaded conical trowel 122 of adjustable diameter of known construction save that, in this instance, the normally-closed end of the trowel 122 is apertured as indicated at 123. A foam swab 124 (FIG. 21) may be used instead of the trowel 122.

The hoses 63 used in the lining method according to the present invention are of plastics material, for example polyvinylchloride and are pre-filled with predetermined volumes of the constituent components of the settable lining composition, namely one with epoxy resin for example, and the other with a hardener and inorganic fillers for example. They can be filled in any convenient manner, i.e. the constituent components pumped into the hose or gravity delivered into the hose, or the hose opened axially to permit filling, the hose then being axially sealed.

The pre-filled hoses are delivered in the required quantities to the site.

Two down hooes, 80 to 100 meters apart say, are cut into the sewer pipeline. These down holes would generally be existing manholes.

Prior to lining the sewer pipe 56 between the down holes there would be inspection thereof by a television facility mounted on a trolley or sledge pulled through the sewer pipe or mounted on a self-propelling "pig". As a result of this preliminary inspection any deeply intruding laterals or tree roots would be cut off; any leaks which would be indicated by water ingress would be sealed; and any major deformation of the transverse cross-section of the sewer pipe would be corrected, i.e. the pipe would be rendered as round or circular as is reasonably possible; any debris resulting from for example, a collapsed pipe wall would be removed.

There would thus be provided, for lining, a relatively water and debris free, reasonably round sewer pipe.

The sewer pipe 56 thus having been prepared, two hoses 63, (epoxy and hardener) are inserted into the pipe 56 and laid in parallel side-by-side relationship on the bottom of the pipe. The hoses 63 are anchored at the "exit" down hole.

The lining machine 50 and trowelling arrangement are inserted through the "inlet" down hole with the delivery tubes 62 leading, and the hoses 63 are axially split and threaded through the lining machine 50 as will be apparent from the subsequent description particularly with reference to FIG. 10, the threaded-through ends also being anchored to the pipe bottom. The trowelling tube 104 is drawn over the spreader guide 118 and conical trowel 12 and is fastened in open tubular configuration by a fixed ring 124 (FIG. 1), or by being suitably fastened to the pipe wall.

In this condition, therefore, the leading end of the delivery tubes 62 with their leading guide skids 68 are inserted into their respective hoses 63. A towing cable is secured to the lining machine 50 and a ground level winch at the "exit" down hole and an air hose to the air vane motor 58, the air supply being also T-junction connected to the air vane motors 100, the air hose being connected to a compressor also at the "exit" down hole. The lining machine 50 is now, or has previously, been charged with the epoxy and hardener components of the settable lining composition.

The lining operation can now commence.

The air supply to the motors 58 and 100 is opened and towing of the lining machine 50 is commenced.

The advancing lining machine 50 forces the epoxy and hardener in the respective hose 63 to flow into the respective delivery tube 62, the slitting structures 69 axially slitting the hoses as indicated at 125 (FIG. 10).

The epoxy and hardener separately pass through their respective delivery tubes 62 into the mixing chamber 65 where they are thoroughly and intimately mixed by the stirring elements 67, the mixture then passing into the centre of the high speed centrifugal impellor 57 which centrifugally throws the settable lining composition against the wall of the sewer pipe 56 as the lining machinne advances to build up a structural lining of predetermined thickness.

The hoses 63 as it is gradually axially slit as at 125 and emptied begins to collapse to a flattened condition as indicated at 126 and then pass in a flattened condition as indicated at 127 into their respective passages 73 in the guide channel 72, the "anti-tracking" shoes 83 ensuring accurate alignment with the passages 73. When the flattened hoses 127 are passing through the passages 73 their closed lateral edges 128 are severed by the edge-severing structures 80.

At the exit end the severed edges 128 follow a return path over guide 86 and between guides 87 and the adjacent delivery tube 62 (the guides are diametrically indicated at 129 in FIG. 10) and are pulled back towards the "exit" down hole by a pull cable 130 connected to a winch at ground level at the "exit" down hole. Preliminary threading of severed edges through the lining machine 50 will, of course, have been effected prior to commencement of the lining operation.

The axially-slit, empty edgeless hoses indicated 131 remain in the bottom of the sewer pipe 56 and are held down by the skid structure 55 and the weight of the lining machine 50 until covered by lining composition thrown out by the centrifugal impellor 57.

It is considered that the intervention of the flattened hoses 131 between the bottom of the sewer pipe 56 and the covering settable lining composition will not detract significantly from the structural strength of the applied lining. It is also considered that the retention of the flattened hoses 131 assists contour smoothing in the pipe 56, i.e. the hoses assist in covering joggled or broken joints between adjacent sewer pipe 56.

Advancement of the lining machine 50 along the sewer pipe 56 is assisted by the driven toothed tractor arrangements described with reference to FIGS. 7 and 8 which claw along the flattened hoses 127 in the channels 73, the hoses 127, in effect, constituting tracks or rails for these toothed tractor arrangements. It is to be understood that these toothed tractor arrangements are not considered essential and may be omitted.

The trowelling arrangement follows on behind the lining machine 50 and it is to be noted that the largest external diameter of the conical trowel 122 is slightly in excess of the internal diameter of the lined sewer pipe 56. The flexible thin-walled trowelling tube 104 secured at 124 is pulled out of its magazine box 113 as the lining machine 50 advances, is gradually opened from a flattened condition to a partially opened condition by the divergent guide 118, is guided onto the conical trowel 122 by the roller nips 117, 120 and is applied, under pressure, against the lined sewer wall by the conical trowel 122. The purpose of pressure applying this trowelling tube to the lined sewer pipe wall is to remove the orange peel surface effect of the applied lining and to render the lined surface smooth.

The completed lined sewer pipe 56 (see FIG. 1A) therefore has in its bottom flattened hoses 131, a set and cured structural lining 132 which is, in effect, a new sewer pipe, and on the surface of the latter the trowelling tube 104. The latter can simply be left in situ if desired, or be removed. If the latter is required, a cord 133 or similar (see FIG. 23) is attached to the inner end of the concertinad tube package 112 and to the ring 124 and when the lining 132 is set or cured the cord 133 is simply pulled on at the "entry" down hole to strip the trowelling tube 104 off the lining 132.

The sewer pipe 56, as aforesaid, has its wall lined (see FIG. 13) with a layer of settable lining material composition 132 over which is laid the trowelling tube 104 and normally this is sufficient given that the applied lining has no inherent tendency to become displaced from the sewer pipe wall. In fact, the lining composition employed is extremely stable and has been found, between application and total hardening or curing, to be stable and position-retentive. However, until total hardening or curing, or substantially so, is achieved there is a risk that ground water of whatever form may provide a sufficient force to push the lining 132 and the trowelling tube 104 away from the sewer pipe wall.

Where this is considered likely a tubular plastics tube or sheath 134 is everted into the lined and trowelled sewer pipe 56 and into engagement with the trowelling tube 104 to resist any such ground water induced displacement until the lining 132 totally hardens or cures, the everted tube 134 being sufficiently pressurized by delivery of fluid, preferably air, thereinto by a pump 135 and delivery nozzle 135A.

This use of a pressurized everted tube to compensate for possible ground water displacement of the sewer lining material and trowelling tube, or possibly only the former if the latter is removed after completion of trowelling will, in most instances, not be necessary.

Edge severing is necessitated because, when a hose such as 63 is flattened, the closed lateral edges do not compress to a wholly flat configuration. They tend to maintain an arcuate or round configuration which is considered undesirable to the structural strength of the lining in that there is likely to be not only raised edges but air retention.

However, it is considered that edge severing can be avoided if hoses such as the hose 136 of FIG. 11 is employed. Such a hose 136 comprises a flat bottom 137 to which is welded a covering strip 138, the welds providing flat edges 139. When the covering strip 138 is axially slit the two portions 138A, 138B fall flat onto the flat bottom 137 so that a flat hose without edge severing is attained.

This hose 136 can be made to suit requirements, i.e. its volumetric capacity can be made or "tuned" to suit the lining thickness required.

Also it is considered that such a hose can be formed in a continuous predetermined length being filled with the constituent component of the lining composition as it is being manufactured.

FIGS. 14 and 15 show a lining apparatus 140 which has three delivery tubes 141 for use with three hoses 142 (two filled with resin, one with hardener). Other parts similar to the previous embodiments have the same reference numbers with the suffix "A".

Reference is now made to FIGS. 16 to 20 which disclose a three-hose lining method and apparatus and an alternative trowelling arrangement.

In this embodiment, however, the axially-slit and emptied hoses are not left in the sewer pipe but are withdrawn in like fashion to the severed hose edges of the first previously-described embodiment.

In this embodiment there are three hoses for each length of sewer to be relined. Two of the hoses contain resin and the third contains the hardening or curing agent. These hoses are sealed at each end. The total quantity of constituent components of the lining composition contained within the three hoses is selected to give a precise predetermined thickness of lining on the sewer pipe wall.

The hoses are laid along the sewer pipe between the down holes. They can be laid in parallel configuration or triangular configuration or there may be a concentric arrangement of hoses but generally the three separate hoses are laid close together in parallal configuration. As the hoses are made of relatively thin plastics material and the surface conditions of a sewer pipe to be relined are not perfect there is a risk that in laying the hoses along the sewer pipe length to be lined one or more of the hoses may be ruptured causing spillage of the constituent component contained therein and this would substantially adversely affect the lining of the sewer pipe wall.

It is considered that this risk can be avoided if the hoses are laid along the sewer length in the manner shown in FIG. 17 of the drawings. The sewer pipe is generally indicated by the reference 150 and the down holes by the reference 151. The hoses are brought to the site reeled on a suitable vehicle as indicated at 152. A dragging or pulling cable 153 would be attached to the free end of the prefilled hoses and threaded through the sewer pipe, being taken up by a driven collection reel 154. The hoses are indicated by the reference 155. Prior to the hoses 155 being pulled through the sewer pipe 150 temporary barriers 156 are provided at each down hole 151 within the sewer pipe 150 and the sewer pipe is flooded with clean water generally indicated at 157. The dragging cable 153 then pulls the hoses 155 through the sewer pipe and as a result of the presence of the water 157 therein the hoses are floated into position between the two down holes 151. When the hoses are in position between the two down holes 151 the temporary barriers 156 are removed and the water is allowed to run away. The hoses are now in position for the lining process to be carried out.

The apparatus for effecting the lining method according to the present invention comprises an air vane motor lining machine generally indicated at 158 (FIG. 16) which machine has a centrifugal spinner head 159 which serves to throw the lining composition centrifugally against the wall of the sewer pipe to lay a lining generally indicated at 160 thereon. The lining apparatus moves along the sewer pipe between the down holes 151 with the spinner head trailing. It is pulled along the sewer on a sledge structure or wheels by cables or wire ropes which would be wound onto a capstan generally indicated at 161 (FIG. 17). The lining apparatus has an axial bore 162 through which the lining composition flows to the centrifugal spinner head 159. In advance of the lining apparatus in terms of the direction of movement of the latter is a hose-slitting and lining composition premixing head which is shown diagrammatically at 163. This comprises one or more slitting blades 164, preferably of fish-tail configuration disposed in a chamber through which the three hoses 155 pass, there being adjacent to the slitting blades a pipe 165 connected to the axial bore 162 of the lining apparatus.

This premixing and slitting head 163 has trailing rollers 166 forming a nip and being driven, and these rollers serve to self-advance the lining apparatus along the sewer pipe by a gripping action on the hoses 155, i.e. they use the hoses as a track.

When the hoses are slit by the blades 164 the constitutent components contained therein spill out and are premixed in the chamber within the premixing and slitting head and pass into the pipe 165 and then into the centrifugal spinner head 159. The constituent components are thoroughly mixed prior to reaching the centrifugal spinner head by high speed rotary blades generally indicated at 167 which blades may be extensions of the throwing blades of the centrifugal spinner head. The slit and emptied hoses 155 ar then conveyed back, i.e. they are pulled back by a suitable calbe or rope, along a roller guide assembly to the "exit" down hole. This pulling cable or rope would be attached to the hoses prior to the commencement of the lining operation. This pulling rope and the hoses can be wound onto the capstan 161 or to another capstan or reel.

The hoses 155 are anchored as generally indicated at 168 at the "exit" down hole 151. This anchoring is essential to allow the self-advancement of the lining apparatus.

While efforts will have been made to clean all water away from the sewer pipe to be lined prior to the commencement of the lining operation there may be depressions as indicated at 169 still containing water and to ensure that such water is removed the lining apparatus may have disposed in advance thereof an ejector 170 to suck up any such water which would then be conveyed by a hosepipe 171 to the above ground level through the "exit" down hole through which the various service hoses and cables are fed.

Various facilities and services are provided on the lining apparatus such as compressed air hoses 172, television inspection facilities 173 and a water supply 174, if necessary, for assisting in the curing action of the lining composition.

In FIG. 18 there is also indicated a trowelling tube supply facility 175 which will be referred to shortly.

The trowelling arrangement of this embodiment comprises (FIG. 19) a trowelling tube application head 176 which has a foam pressur ehead 177 of a diameter greater than the diameter of the lined sewer pipe. The trowelling tube 178 is fed from the supply facility 175 through a static central hollow shaft of the lining apparatus in a compressed or flattened condition and is then opened into a circular configuration by passage through a guide configuration of the application head which serves to open the tube and to deliver it in open condition between the foam pressure head 177 and the lining 160. The trowelling tube 178 is thus pressed against the lining 160 which removes the aforementioned orange peel effect. Guide elements 179 serving to open and deliver the trowelling tube 178 to its location between the foam head 177 and the lining 160 are such as to have low friction surfaces to ensure free unimpeded opening of the trowelling tube.

The end of the trowelling tube, i.e. the last portion to be applied to the lined sewer pipe wall preferably has a means such as cord, cable or similar 180 attached thereto so that when the trowelling by the trowelling tube 178 is completed the tube can be removed from the lined wall by pulling on the cord 180.

The end result is a smooth substantially constant depth lining on the sewer wall.

The arrangement shown in FIG. 20 is substantially the same as that shown in FIG. 19 but in this case the trowelling tube 181 is delivered to the application head rearwardly of the latter in terms of movement of the overall lining apparatus. Again the trowelling tube 181 would be anchored but this time at the "entry" down hole end whereat the lining operation is commenced. Again when the trowelling operation by the trowelling tube is completed the tube is simply stripped off the lined sewer pipe wall.

Reference is now made to FIGS. 24 to 30 of the accompanying drawings.

The sewer pipe is indicated by the reference 200.

The lining apparatus comprises three cranked or swan-neck delivery tubes 201, 202 and 203 supported on a skid mounted carriage (not shown). The prefilled hoses (only one shown) are designated by the reference 204. Each of these hoses has diametrically opposed seams 205.

At the hose entry end of each delivery tube (see FIG. 27) is a diametrically located blade 206 which engages in the seams 205 of the hose 204 to constrain the latter to follow a true rectilinear path without rotating relative to the delivery tube. It is to be noted that the blade 206 at its leading end tapers as indicated at 207 to facilitate entry into the hose 204.

Immediately rearwardly of the leading end of the delivery tube is a cutting blade 208 which is releasably supported in a holder 209 to facilitate replacement when the blade is damaged or becomes blunt. This blade serves to slit the hose as the delivery tube is pushed therethrough.

These delivery tubes 201 to 203 (see FIGS. 28, 30 and 31) are in communication with passages 210 in the lining apparatus which passages communicate in turn with an annular mixing chamber 211 immediately rearwardly of the bladed throwing impellor 212 of the centrifugal lining machine. The annular passage 211 opens into the bladed impellor 212 and the blades 213 of the impellor are provided with extensions 214 which serve as mixing blades for the constituent components of the settable lining composition which, it will be appreciated, come together for the first time in the annular chamber 211.

The bladed impellor 212 is mounted on a shaft 215 and is driven by an air motor 216 via gearing 217, 218.

The skid structure of the lining apparatus is indicated at 219.

The bladed rotor 212, as is usual, centrifugally impels the lining material against the wall of the sewer, which lining tends to have the orange peel effect previously mentioned which is removed and smoothed out in the manner previously disclosed.

Referring again to FIGS. 24 to 26 the slit and emptied hose 204, through which the delivery tube 201 is progressed, passes firstly between two guide rollers 220, 221 having vertical axes 222. The hose through which delivery tube 202 progresses passes around the outside of roller 220 and similarly the hose through which delivery tube 203 progresses passes around the outside of roller 221. The three hoses 204, now slit, emptied and of flattened configuration, come together and pass between two power driven rollers 223, 224 again with vertical axes 225 and downstream of the rollers 220, 221 in terms of lining apparatus movement through the sewer pipe. These power driven rollers, which form in effect a mangle, are driven by an air motor 226 connected through a shaft and coupling arrangement 227 with a worm 228 meshing with a wheel 229, 230 meshing respectively with the vertical axis of spindle 225 of the rollers 223, 224.

Downstream of the mangle rollers 223, 224 is a guide roller 231 freely rotatable about a vertical axis 232 and the emptied and flattened hoses 204 pass around this roller 231 back towards their anchored ends, the hoses 204 being pulled back in that direction by a rope or wire (not shown) coupled to a winch (also not shown).

We claim:

1. A method of lining a pipe comprising the steps of laying along the pipe hose means filled with a predetermined quantity of settable lining composition to be applied against the pipe wall; advancing a centrifugal lining machine along the length of the hose means; axially slitting the hose means in front of the advancing centrifugal lining machine to permit egress of the lining composition from the hose means; and guiding the egressing lining composition into the centrifugal lining machine for application to the pipe wall as it advances along the hose means.

2. A method as claimed in claim 1 comprising the step of anchoring the hose means at each end within the pipe.

3. A method as claimed in claims 1 or 2 comprising the step of guiding slit and emptied hose means into a flattened condition against the pipe wall where it is covered by lining composition applied against the pipe wall.

4. A method as claimed in any one of claims 1 or 2 comprising the step of trowelling or smoothing the lining composition applied against the pipe wall by applying against the lining composition rearwardly of the centrifugal lining machine and under pressure a flexible thin-walled tube.

5. A method as claimed in claim 4 comprising the step of removing the trowelling tube after the lining composition has sufficiently set or cured on the pipe wall.

6. A method as claimed in claim 4 comprising the step of leaving the trowelling tube in situ after completion of the pipe lining process.

7. A method as claimed in any one of claims 1 or 2 in which the settable lining composition comprises a synthetic resin and a hardener.

8. A method as claimed in claim 7 in which the settable lining composition includes inorganic filling material.

9. A method as claimed in claim 8 in which the resin is an epoxy resin or polyurethane.

10. A method as claimed in any one of claims 1 or 2 comprising the steps of laying a pair of hoses in parallel array along the bottom of a pipe to be lined, the hoses having been filled with a respective component constituent of a two-shot resinous settable lining composition, anchoring the hoses at each end to the bottom of the pipe, advancing a centrifugal lining machine along the length of the hoses, slitting the hoses in front of the advancing centrifugal lining machine to permit egress of the respective constituent components of the lining composition from the hoses, separately guiding the lining composition components to a mixing chamber immediately rearwardly of a centrifugal impellor of the centrifugal lining machine, and delivering the admixed settable composition components to the centrifugal impellor for application of the settable composition to the pipe wall as the centrifugal lining machine advances along the pipe.

11. A method as claimed in claim 10 comprising the step of constraining the slit and emptied hoses to lie in a flattened condition against the bottom of the pipe wall where they are covered by the lining composition applied by the centrifugal lining machine.

12. A method as claimed in claim 10 comprising the steps of severing the closed lateral edges of the slit, emptied, flattened hoses, and removing the severed edges from the pipe.

13. A method as claimed in claim 12 comprising the step of pulling the severed hose edges out of the pipe in the direction of advancement of the centrifugal lining machine.

14. A method as claimed in claim 12 comprising the step of guiding each slit, emptied, flattened hose to an edge-severing zone to resist any tendency of the hose from "tracking", whereby misalignments between the hose edges and edge-severing means is avoided.

15. A method as claimed in claim 4 comprising the step of trowelling or smoothing the applied lining composition by means of flexible thin-walled material provided in a magazine in the form of a flat tube folded transversely and longitudinally to concertina-like configuration, the trowelling action being affected by anchoring one end of the flexible thin-walled material in open tubular configuration within the pipe at a location constituting a starting point for a pipe-lining run, advancing the magazine along the pipe in trailing relationship to the centrifugal lining machine to cause extraction of the flexible thin-walled tube from the magazine, guiding the extracted tube from its flat folded condition to open tubular configuration, and applying the open tube under pressure against the applied lining composition rearwardly of the magazine.

16. A method as claimed in claim 15 comprising the step of guiding the flat folded tube along a divergent path to effect its opening to open tubular configuration.

17. A method as claimed in claim 1, comprising the steps of anchoring the hose means at that end to which the centrifugal lining machine is advanced, and, upon egress of the lining composition from the hose means, guiding the slit, emptied hose means back towards said anchored end in advance of the centrifugal lining machine in a flattened, or substantially flattened, condition.

18. A method as claimed in claim 17 comprising the step of returning the slit emptied hose means back towards its anchored end by pulling same through a return bend over a guide roller.

19. Apparatus for lining a pipe with a settable lining composition contained in hose means laid along the pipe, the apparatus being adapted to be advanced through the pipe and comprising a centrifugal lining machine having inlet means for the settable lining composition, delivery tube means connected, at one end, to the inlet means and adapted, at the other end, for insertion into the hose means filled with the settable lining composition, and hose-slitting means at or adjacent the other end of the delivery tube means for axially slitting the hose means as the delivery tube means is urged into the hose means, whereby the settable lining composition can flow from the hose means into the delivery tube means and thence to the centrifugal lining machine.

20. Apparatus as claimed in claim 19 comprising means disposed beneath the delivery tube means for constraining the slit and emptied hose means against the pipe wall in a flattened condition for eventual coverage by the settable lining composition.

21. Apparatus as claimed in claim 19 in which the hose-flattening means comprises relatively narrow guide channel means through which the slit emptied hose means id constrained to pass and a skid structure, trailing the guide channel means in terms of the direction of apparatus advancement through the pipe, under which the slit, emptied, flattened hose means passes to be forced against the pipe wall by the weight of the apparatus.

22. Apparatus as claimed in claim 21 in which the guide channel means comprises fixed top plate means and a removable bottom plate means.

23. Apparatus as claimed in claims 21 or 22 comprising severing means projecting into the guide channel means adjacent each edge thereof for severing the closed lateral edges of the axially slit, emptied, flattened hose means passing through the channel means.

24. Apparatus as claimed in claim 23 comprising guide means adjacent the top of the apparatus whereby the severed hose edges can follow a return path for removal from the pipe in the direction of apparatus advancement along the pipe.

25. Apparatus as claimed in any one of claims 21 or 22 comprising, above and extending into the guide channel means, driven rotary toothed means adapted to bit into the hose means to assist advancement of the lining apparatus along the hose means.

26. Apparatus as claimed in claim 23 comprising, adjacent to but spaced from the inlet end of the guide channel means, "anti-tracking" show means around which the axially slit, emptied hose means passes prior to entering the guide channel means whereby the hose means is accurately presented to the edge-severing means.

27. Apparatus as claimed in claim 26, in which the "anti-tracking" shoe means is supported in cantilever manner from the top plate means of the guide channel means.

28. Apparatus as claimed in any one of claims 21 or 22 wherein the guide channel means and "anti-tracking" shoe means constitute a sub-assembly detachably connected to the apparatus.

29. Apparatus as claimed in any one of claims 19 to 22 comprising, at the other end of the delivery tube means, axially-directed skid means adapted to contact the interior of the hose means diametrically opposite the hose-slitting location.

30. Apparatus as claimed in claim 26 comprising a pair of delivery tubes with an associated twin guide channel and a respective "anti-tracking" shoe, the apparatus being adapted for use with a two-shot, settable resinous lining composition.

31. Apparatus as claimed in claim 30 comprising, between outlets of the delivery tubes and an inlet of a centrifugal impellor of the centrifugal lining machine, a mixing chamber wherein the two constituent components of the settable resinous lining composition are mixed prior to entering the centrifugal impellor.

32. Apparatus as claimed in claim 31 in which the centrifugal impellor is driven by an air vane motor via reduction gearing.

33. Apparatus as claimed in claim 32 in which the centrifugal impellor mounts stirring means extending into the mixing chamber to ensure thorough and intimate mixing of the constituent components of the settable lining composition.

34. Apparatus as claimed in claim 30 in which each guide channel mounts on its top plate a rotary toothed means extending into the guide channel, each of said rotary, hose-engaging, toothed means being driven by an air vane motor and the two rotary toothed means being coupled together by a chain and chainwheel transmission.

35. Apparatus as claimed in claim 32, in which the centrifugal impellor is supported by a rotatable tubular shaft through which extends a static shaft projecting axially outwards of the centrifugal impellor.

36. Apparatus as claimed in claim 35 comprising a lining trowelling or smoothing arrangement adapted to be coupled to the static shaft for towing along the pipe in trailing relationship to the lining apparatus.

37. Apparatus as claimed in claim 36 in which the trowelling arrangement comprises a magazine containing a concertina-like supply of folded flattened flexible thin-walled tube constituting a trowelling medium, the magazine having a slot exit for the flattened tube, means for initiating opening of the latter from its folded flattened condition into open tube configuration as it exits from the slot, and means for applying the fully opened tube, under pressure, against the lined pipe wall.

38. Apparatus as claimed in claim 37 in which the flattened tube opening means comprises a divergent guide member located within a divergent mouth of the magazine, the wider end of each of the guide member and mouth being remote from the lining apparatus and mounting rollers defining ribs between which the opening tube passes in guided manner to the pressure means for applying the fully-opened tube against the pipe wall lined with the settable lining composition.

39. Apparatus as claimed in claim 37 in which the pressure-applying means is a conical sprung trowel of adjustable diameter.

40. Apparatus as claimed in claim 39 in which the divergent guide member and leading end of the conical trowel are apertured to permit air flow to the trowelling tube interior and thereby avoid any resistance to its emergence from the magazine.

41. Apparatus as claimed in claim 37 in which a cord or similar is connected between the ends of the trowelling tube, whereby, after setting or curing of the lining, the trowelling tube can be stripped off simply by pulling on the cord or similar.

42. Apparatus as claimed in claim 37 in which the trowelling tube is adapted, at the commencement point of a lining run to be secured to a holding ring to provide a fully-open configuration of trowelling tube in contact with the pipe wall.

43. Apparatus as claimed in claim 36 comprising a supply of folded or reeled flexible thin-walled tube constituting a trowelling medium carried by, or in advance of, the lining machine for passage rearwardly of the latter, and means for opening the tube to open tube configuration rearwardly of the lining apparatus and means for applying the fully opened tube, under pressure, against the lined pipe wall.

44. Apparatus as claimed in claim 43, in which the tube passes rearwardly of the lining machine through a hollow shaft therein.

* * * * *